Patented Sept. 17, 1929

1,728,174

UNITED STATES PATENT OFFICE

JOSEPH R. DAWSON, OF FLUSHING, NEW YORK, ASSIGNOR TO ELECTRO METALLURGICAL COMPANY, A CORPORATION OF WEST VIRGINIA

WELDING ROD

No Drawing. Application filed March 8, 1924. Serial No. 697,945.

This invention relates to welding rods or the like adapted for use in the production of steel welds of great hardness and strength. A particular object of the invention is to provide for this purpose alloy steel welding rods having a low carbon content. In a preferred form of my improved alloy composition for such rods, vanadium in excess of 0.25% is used to impart the desired qualities to the weld.

The difficulties which attend the use of high-carbon steel in welding have heretofore been recognized. Ordinarily weld metal of good quality is not produced if the carbon content is much in excess of 0.5%, as blowholes and other non-uniformities appear. With less than 0.5% carbon, in the absence of some other hardening agent, adequate hardness and strength can not ordinarily be obtained for welding or armoring railway track members, or for other purposes where those qualities are required in a high degree. To avoid these difficulties and to secure hardness, strength, toughness, and other desirable characteristics, it has been proposed to use steel welding rods containing chromium, with or without other hardening metals, carbon being preferably kept below 0.5%.

I have discovered that vanadium may advantageously be substituted in certain proportions for a part of the carbon or for a part or all of the chromium as a hardening agent in steel compositions for welding rods which are to be used in producing welding metal of a high degree of hardness. Vanadium does not give rise to the objectionable weld characteristics of high carbon, and under some conditions it may produce beneficial effects not obtained with chromium alone. Vanadium steel welds are exceptionally strong, tough, and resistant to shock.

I prefer to have the carbon content of the welding rod between 0.1% and 0.5%. The vanadium content may be varied considerably. The beneficial effect of the metal is especially evident when it is present in amounts of about 0.3% to 0.7%. If a greater amount of vanadium is used the weld frequently tends to be brittle.

As illustrative of the invention, and without limitation to the specific proportions stated, it may be said that good results are obtained with welding rods having approximately the folowing composition:

|  | Per cent |
|---|---|
| Carbon | 0.11 |
| Vanadium | 0.55 |
| Chromium | 1.30 |

Remainder chiefly iron.

In most cases manganese and silicon, in amount less than 1.5% of each, will also be present.

The improved welding alloy is adapted for fusion either by the electric arc or before the blowpipe to supply fluid metal for welding, filling, sheathing, or like operations. A coating, admixture, or core of oxidation-preventing or slag-forming material may be supplied to the rod or other form into which the alloy may be shaped, in ways well understood in the art. However, I have discovered that vanadium does not show any pronounced tendency to oxidize and the greater portion of it remains in the weld metal, even when no protecting means are used.

It will be apparent from the foregoing that the use of vanadium permits variations in carbon and chromium content which will frequently prove useful. Such variations are within the scope of the invention, as defined in the appended claims.

I claim:

1. A welding rod consisting of an iron alloy containing about 0.5% vanadium, less than 0.2% carbon, and about 1.2% chromium.

2. A welding rod consisting of an iron alloy containing about 0.3 to 0.7% vanadium, less than 0.5% carbon and about 1.2% chromium.

In testimony whereof, I affix my signature.

JOSEPH R. DAWSON.